(12) United States Patent
Manthe et al.

(10) Patent No.: US 9,108,263 B2
(45) Date of Patent: Aug. 18, 2015

(54) WELDING POWER SOURCE WITH AUTOMATIC VARIABLE HIGH FREQUENCY

(75) Inventors: Alan A. Manthe, Hortonville, WI (US); Stephen P. Ferkel, Appleton, WI (US); Glenn A. Koosmann, Port Edwards, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2062 days.

(21) Appl. No.: 11/796,825

(22) Filed: Apr. 30, 2007

(65) Prior Publication Data

US 2008/0264915 A1   Oct. 30, 2008

(51) Int. Cl.
B23K 9/10        (2006.01)
B23K 9/067       (2006.01)

(52) U.S. Cl.
CPC .................................. B23K 9/0673 (2013.01)

(58) Field of Classification Search
USPC ............... 219/130.1, 130.31, 130.01, 130.21
See application file for complete search history.

(56) References Cited

U.S. PATENT DOCUMENTS

| | | | |
|---|---|---|---|
| 3,253,184 A | 5/1966 | Willecke et al. | |
| 3,876,855 A | 4/1975 | Hirasawa et al. | |
| 4,507,533 A * | 3/1985 | Inoue ......................... | 219/69.18 |
| 4,769,754 A | 9/1988 | Reynolds | |
| 4,849,651 A * | 7/1989 | Estes, Jr. ...................... | 307/125 |
| 4,918,285 A | 4/1990 | Thommes | |
| 4,943,699 A | 7/1990 | Thommes | |
| 5,086,205 A | 2/1992 | Thommes | |
| 5,149,933 A | 9/1992 | Donner | |
| 5,338,916 A | 8/1994 | Blankenship et al. | |
| 5,345,376 A | 9/1994 | Nourbakhsh | |
| 5,381,076 A | 1/1995 | Nerone | |
| 5,498,936 A | 3/1996 | Smith | |
| 5,991,180 A | 11/1999 | Vogel et al. | |
| 6,075,224 A * | 6/2000 | De Coster .................. | 219/130.4 |
| 6,091,612 A | 7/2000 | Blankenship | |
| 6,114,655 A | 9/2000 | Reynolds | |
| 6,278,081 B1 | 8/2001 | Reynolds | |
| 6,359,420 B1 | 3/2002 | Hitchcock | |
| 6,504,132 B1 * | 1/2003 | Church ....................... | 219/130.1 |
| 6,504,497 B2 | 1/2003 | Jang et al. | |
| 6,567,283 B2 | 5/2003 | Welches | |
| 6,670,779 B2 | 12/2003 | Shen | |

(Continued)

FOREIGN PATENT DOCUMENTS

EP      560666        9/1993
GB      2300079       10/1996

(Continued)

Primary Examiner — Dana Ross
Assistant Examiner — Ayub Maye
(74) Attorney, Agent, or Firm — Fletcher Yoder P.C.

(57) ABSTRACT

A high frequency power source configured to provide a variable voltage output is described such as for use in welding systems. The high frequency power source charges a capacitive storage device. A transformer having a primary winding coupled to the output of the high frequency power source and establishing a resonant frequency signal with the capacitive storage device, and a secondary winding coupled to the welding power supply, superimposes the resonant frequency signals onto the welding power signal of the welding power supply during periods of the resonant rings. By varying the voltage output from the high frequency power source, the high frequency energy delivered to the welding torch can be optimized for a variety of welding applications.

20 Claims, 3 Drawing Sheets

(56) References Cited

U.S. PATENT DOCUMENTS

| | | |
|---|---|---|
| 6,801,018 B2 | 10/2004 | Kranister et al. |
| 6,801,443 B2 | 10/2004 | Manthe |
| 6,803,730 B2 | 10/2004 | Nadd et al. |
| 6,825,435 B1 | 11/2004 | Brown |
| 6,909,622 B2 | 6/2005 | Weng |
| 7,078,870 B2 | 7/2006 | Bocchiola |
| 7,081,598 B2 | 7/2006 | Llic et al. |
| 2004/0079739 A1 | 4/2004 | Mela |
| 2004/0206736 A1 | 10/2004 | Nishikawa et al. |
| 2006/0231532 A1 | 10/2006 | Bunker et al. |
| 2006/0238138 A1 | 10/2006 | Quazi |

FOREIGN PATENT DOCUMENTS

| | | |
|---|---|---|
| WO | 97/01211 | 1/1997 |
| WO | 02/077738 | 10/2002 |

\* cited by examiner

WELDING POWER SOURCE WITH AUTOMATIC VARIABLE HIGH FREQUENCY

BACKGROUND

The present invention relates generally to the field of welding systems, and more particularly to power sources used for creating high frequency, high voltage, low current pulses used to initiate and maintain arcs in such systems for the purpose of welding or cutting.

A wide range of welding techniques have been proposed and are presently in use. In general, welding of metals is performed by melting one or more base metals in a work piece, as well as an adder metal in certain applications. One particularly useful welding technique, well suited for precise or intricate welding, is tungsten inert gas (TIG) welding. In TIG systems, a metal electrode, typically made of tungsten, is provided in a welding torch, and is generally not consumed (i.e., added to the base metal) during welding. Electric current is channeled through the electrode, and a flow of a shielding gas surrounds the electrode during the welding operation, generally provided by fluid conduits leading to the welding torch. An arc is struck between the electrode and the workpiece to melt the workpiece. Adder metal can be provided but, in general, welding takes place by the fusion of the workpiece metals.

As opposed to certain other welding techniques, in TIG welding applications, it is desirable to strike and maintain an arc with little or no contact between the electrode and the workpiece. However, the arc itself may be somewhat difficult to strike and maintain based upon the welding power alone. Therefore, to aid in striking and maintaining the arc, a welding power supply may be designed to superimpose a high frequency, high voltage, low current waveform on a base waveform applied to the welding electrode via the welding torch. When welding with DC power, the high frequency pulse train may be provided only during start-up or loss of the arc. In AC welding, the pulse train may similarly be provided during start-up, but may also be provided continuously, where desired, so as to stabilize the arc and prevent the arc from being rectified or extinguished during polarity reversals of the AC waveform (zero cross). The systems may sense whether an arc is established or maintained in order to provide closed loop control of the application of the high frequency waveform accordingly.

High frequency waveforms for establishing and maintaining arcs in TIG welding systems have typically been provided by a high frequency arc starter circuit. Such circuits may utilize electronic or capacitive discharge methods to deliver high frequency energy directly or through a coupled inductor to the welding torch to initiate non-contact arc starting. For example, a capacitor may be charged to a relatively constant voltage. Once the voltage level is reached, the capacitor is discharged, releasing the stored energy to the welding torch to ionize a gas column to initiate an arc start or re-ignition (AC arcs).

Although using a relatively constant voltage for initiating and maintaining arcs in TIG welding systems functions adequately, it is not without drawbacks. In certain welding applications, it may be desirable to increase or decrease the amount of high frequency energy in the arc. For example, when welding at low currents (i.e. below 10 amps), it is desirable to have less high frequency energy in the arc to re-ignite at zero cross. Too much high frequency energy may cause excessive heat build up and result in a poor quality weld. Furthermore, reducing the amount of high frequency energy may also reduce the amount of electro-magnetic interference (EMI).

For other welding applications, it may be desirable at times to increase the amount of high frequency energy in order to overcome leakage paths in the welding torch or in other components of the welding system.

To avoid the drawbacks of the prior art, there is a need, therefore, for an improved welding power supply with a variable high frequency output for optimizing the delivery of high frequency energy for different welding applications.

BRIEF DESCRIPTION

The present invention provides a novel welding power supply having a variable high frequency output. The power supply may be used in a wide range of settings, including in various TIG welding systems. The power supply of the present invention is designed to replace existing power supplies used in conventional systems, with little or no change to the other components of the systems, making it ideal for integration into existing system designs.

A welding system utilizing the power supply of the present invention has an advantage over the prior art in that such a system can adjust the high frequency output to deliver an optimal level of high frequency energy to a welding torch for a variety of welding applications. Another advantage of the present invention is that a variable high frequency output allows an operator to control the amount of EMI emitted from the welding system. A further advantage of the present invention is improved arc performance throughout the output range of the welder (i.e. lower intensity at low current welds, higher intensity at high current welds). A still further advantage is that an operator may adjust the high frequency output to reduce leakage and improve arc starting performance.

In accordance with embodiments of the present technique, the welding power supply includes a high frequency power source configured to provide a variable voltage output. The output of the high frequency power source is coupled to the primary winding of a transformer, establishing a resonant frequency signal with a capacitive storage device. The power supply further includes a switching device for regulating resonant rings between the capacitive storage device and the primary winding by charging and discharging the capacitive storage device at discrete time intervals. A high frequency controller regulates the output of the high frequency power source. As a result, the amount of high frequency energy in the resulting arc can be controlled and optimized for various welding applications.

The high frequency power source may also include a component in parallel with the switching device to produce an additional current path so that a resonant current will flow between the transformer, the switching device, and the capacitive storage device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
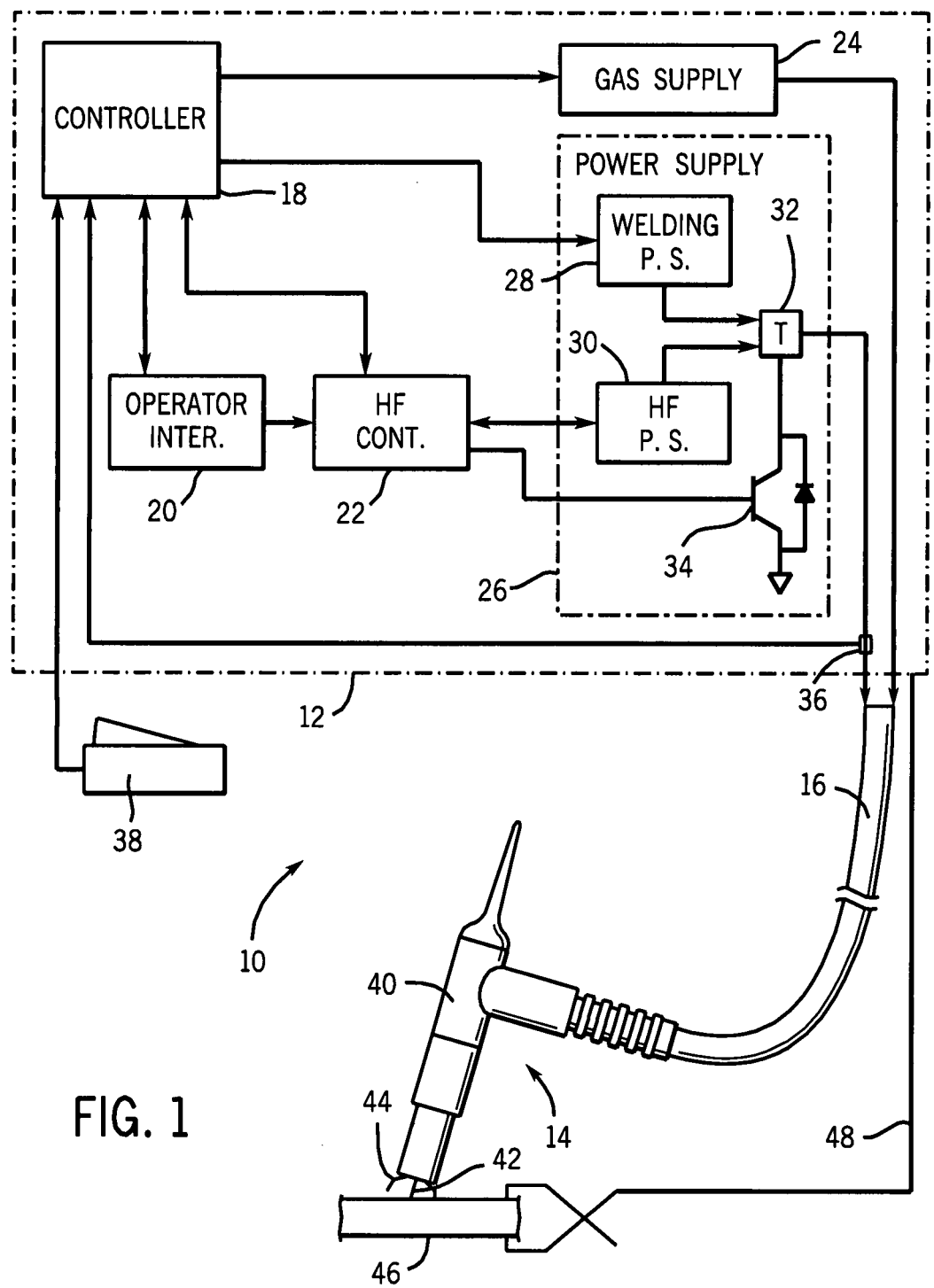
FIG. 1 is a diagrammatical representation of an exemplary TIG welding system employing a welding power supply with a variable high frequency intensity power supply, in accordance with an exemplary embodiment of the invention.

Turning now to the drawings, and referring first to FIG. 1, an exemplary welding system 10 is illustrated that makes use of a variable high frequency power source in accordance with the present invention. As noted above, it should be borne in mind that while this disclosure primarily discusses the application of this invention in TIG welding systems, different types of welding systems may be used and may benefit from the variable high frequency power source of the present invention.

The exemplary TIG welding system 10 of FIG. 1 includes a base unit 12 that supplies welding resources to a welding torch 14 via a welding cable 16. As illustrated, the base unit 12, which may typically be enclosed as a single unit in a stationary or portable cabinet, includes a welding system controller 18 that regulates operation of the various subsystems. The welding system controller 18 may include any suitable control circuitry and will typically be based upon a general purpose or application-specific microprocessor or microcontroller, programmable logic controller (PLC), or other programmed control circuitry. Although not represented, the controller is, of course, supported by ancillary devices and circuitry, such as power supplies, memory devices, signal conditioning circuitry, and so forth.

The welding system controller 18 receives inputs from an operator interface 20 and a high frequency controller 22. Where operator inputs are used, these may be provided by digital devices, analog circuits (i.e., dials with associated potentiometers), and so forth. Moreover, other inputs may include, for example, inputs for selecting whether a gas is to be applied to the weld, and whether the waveform applied to the welding torch is to be an AC or DC waveform.

Based on the operator interface 20, high frequency controller 22, or other inputs provided, the welding system controller 18 regulates a gas supply 24, and a power supply 26. Based on inputs received from the high frequency controller 22, the welding system controller 18 may likewise provide inputs to the high frequency controller 22 for varying the high frequency output. Where such welding resources are provided, the gas supply 24 will provide a regulated flow of a shielding gas via the welding cable 16 to the welding torch 14. Typically, welding gases may include inert gases, such as argon, although other shielding fluids may also be used. In general, the system may or may not include such a gas supply, depending on the nature of the welding technique.

The power supply 26 draws input power from a power grid or from another source of power, such as an engine-driven generator in mobile or portable welding applications (not shown). The power supply 26 will typically rectify an input AC waveform to generate a DC voltage. The power supply may then invert or otherwise convert the DC power to AC power when AC waveforms are selected for welding. Alternatively, DC output signals may be provided by the power supply for DC welding.

In a present embodiment, the power supply 26 includes a primary welding power source 28 and a high frequency power source 30 providing a variable voltage output. The outputs of the high frequency power source 30 and the welding power source 28 are respectively coupled to the primary and secondary windings of a transformer 32. As will be discussed in greater detail below, the high frequency controller 22 controls a switching device 34 and regulates resonant rings between a capacitive storage device (not shown in FIG. 1) and the primary winding of the transformer 32. During periods of resonant rings, the transformer 32 superimposes resonant high frequency signals onto the welding power signal from the welding power source 28. By varying the high frequency power source 30 output, the amount of high frequency energy in the resulting arc can be controlled and optimized for various welding applications. Although not represented, the high frequency controller 22, like the welding system controller 18, is also supported by ancillary devices and circuitry, such as power supplies, memory circuitry, signal conditioning circuitry, and so forth.

The welding resources, and in the illustrated embodiment the shielding gas and the electrical power for welding, are then delivered to the welding cable 16. The welding cable 16 will be coupled to the welding torch 14 that includes a handle 40. A switch, typically in the form of a foot pedal 38 can be activated (i.e., depressed) by an operator for initiation of the welding process. In a present embodiment, a signal is delivered from the foot pedal 38 to the welding system controller 18 when the foot pedal switch is activated, thereby signaling the welding system controller 18 to initiate the delivery of shielding gas and power to the welding torch 14. In a typical gas-shielded TIG welding application, the delivery of these resources causes shielding gas 44 to be fed from the welding gun to surround the torch electrode 42. When the electrode approaches a workpiece 46, an arc is established between the electrode and the workpiece causing melting of the workpiece under the control of the welder. The electrical circuit is closed by returning current to the base unit 12 through the work lead, as represented by reference numeral 48 in FIG. 1.

In certain applications, one or more sensors, represented generally by reference numeral 36, may be provided for detecting parameters of the power applied to the welding torch. As will be appreciated by those skilled in the art, as arcs are initiated and maintained during welding, as well as when arcs are extinguished, voltage and current levels of the applied power may change, indicating whether the arc exists and is stable. Feedback from such sensors may be used by the welding system controller 18 for closed-loop regulation of operation of the power supply 26, effectively superimposing the high frequency waveform from the device on the applied power at periods during welding when the arc is in need of initiation or stabilization.

Figure 2:
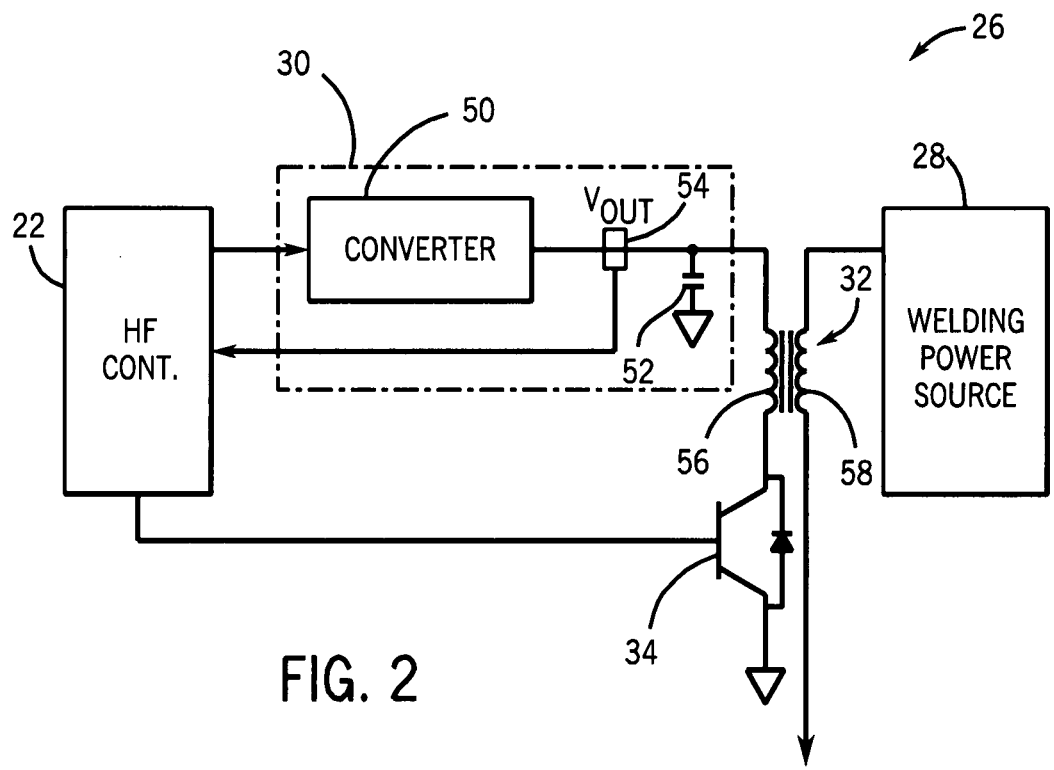
FIG. 2 is a diagrammatical view of an equivalent circuit for a variable high frequency power source for use in a TIG welding system, in accordance with an exemplary embodiment of the invention.

FIG. 2 illustrates an exemplary equivalent circuit in which a high frequency power source 30 with variable voltage output of the present invention could be applied. As illustrated in FIG. 2, the power supply 26 may include a high frequency power source 30 designed to cooperate with a primary welding power source 28. The high frequency power source 30 comprises a power converter 50 coupled to a capacitor 52. The output of the high frequency power source 30 is coupled to an inductor 56 and establishes a resonant frequency signal with the capacitor 52. A switching device 34 is configured to discharge the capacitor 52 at discrete time intervals. The inductor 56 forms the primary winding of the transformer 32 that includes a secondary winding 58 designed to receive the welding power signal from the welding power source 28. The welding power source 28 may output an AC or DC welding signal, as discussed above. The combination of the inductor 56 and winding 58 effectively serves to superimpose the high frequency signal that will be induced by the inductor 56 onto the welding power signal already present on the secondary winding 58, thereby applying high voltage spikes at a high frequency to the welding torch 14 for establishing or maintaining arcs or both.

A preferred embodiment of the high frequency power source 30, in accordance with aspects of the present invention, may be implemented using a flyback converter to step up the input voltage ($V_{in}$) to a variable regulated output voltage ($V_{out}$). However, it will be understood by those skilled in the art that various types of power converters may be used, such as a forward converter, a boost converter, or a buck converter. The level of $V_{out}$ is determined by a reference signal provided by the high frequency controller 22, which may be implemented by using an analog, digital, or pulse width modulation (PWM) signal. The $V_{out}$ reference signal is variable and can be determined automatically through system parameters detected by sensors 36 illustrated in FIG. 1, or manually adjusted based on user inputs from an operator interface, as will be discussed in further detail below.

In addition to generating the reference signal, the high frequency controller 22 also controls the switching device 34 to regulate the resonant rings between the capacitor 52 and inductor 56. The switching device 34 may be implemented using various types of current controlling devices, including but not limited to an insulated gate bipolar transistor (IGBT), a silicon controlled rectifier (SCR), a bipolar junction transistor (BJT), relays, and opto-coupled switches. The high frequency controller 22 is configured to turn the switching device 34 on and off (i.e. close and open) at discrete time intervals and, accordingly, charge and discharge the capacitor 52. By adjusting $V_{in}$, the high frequency controller 22 regulates the voltage output ($V_{out}$) of the high frequency power source 30. As a result, the amount of high frequency energy in the resulting arc can be controlled and optimized for various welding applications.

A sensor, denoted as reference numeral 54, measures and feeds back the voltage output from the power converter 50 to the high frequency controller 22. As discussed above, the high frequency controller 22 communicates with the welding system controller 18. By ascertaining the current voltage output level from the high frequency power source 30, the welding system controller 18 and the high frequency controller 22 can determine, based on the current voltage output and other welding parameters, whether or not the voltage output from the high frequency power source 30 needs to be increased or decreased to optimize high frequency energy for a particular welding application.

Figure 3:
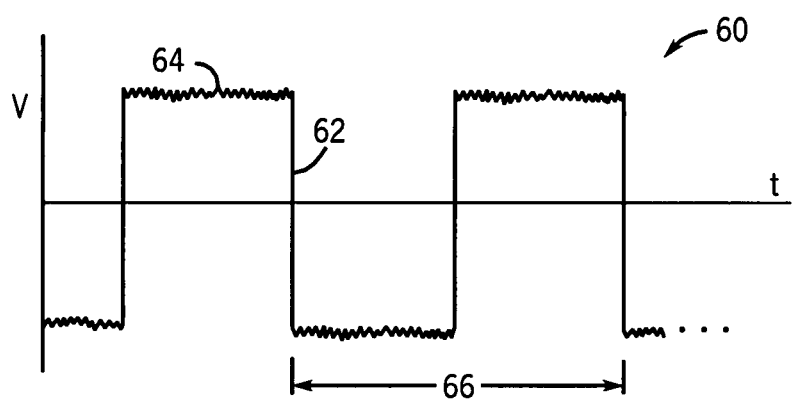
FIG. 3 illustrates exemplary waveforms resulting from the superposition of the high frequency output of the circuit of FIG. 2 on a welding power signal.

The resulting signal produced by superimposing the high frequency signal produced by the high frequency power source 30 onto the welding power signal produced by the welding power source 28 may be of the type illustrated generally in FIG. 3. FIG. 3 illustrates a high voltage, high frequency waveform superimposed on an AC waveform for welding purposes. The combined voltage waveform 60 will have a voltage that varies in polarity as a function of the primary welding power waveform 62 on which the high frequency waveform is superimposed. The wavelength 66 illustrated in FIG. 3, for example, may correspond to a 60 Hz AC signal. The high frequency signal may appear, in FIG. 3, as a noisy voltage level as indicated generally at reference numeral 64 in FIG. 3.

Figure 4:
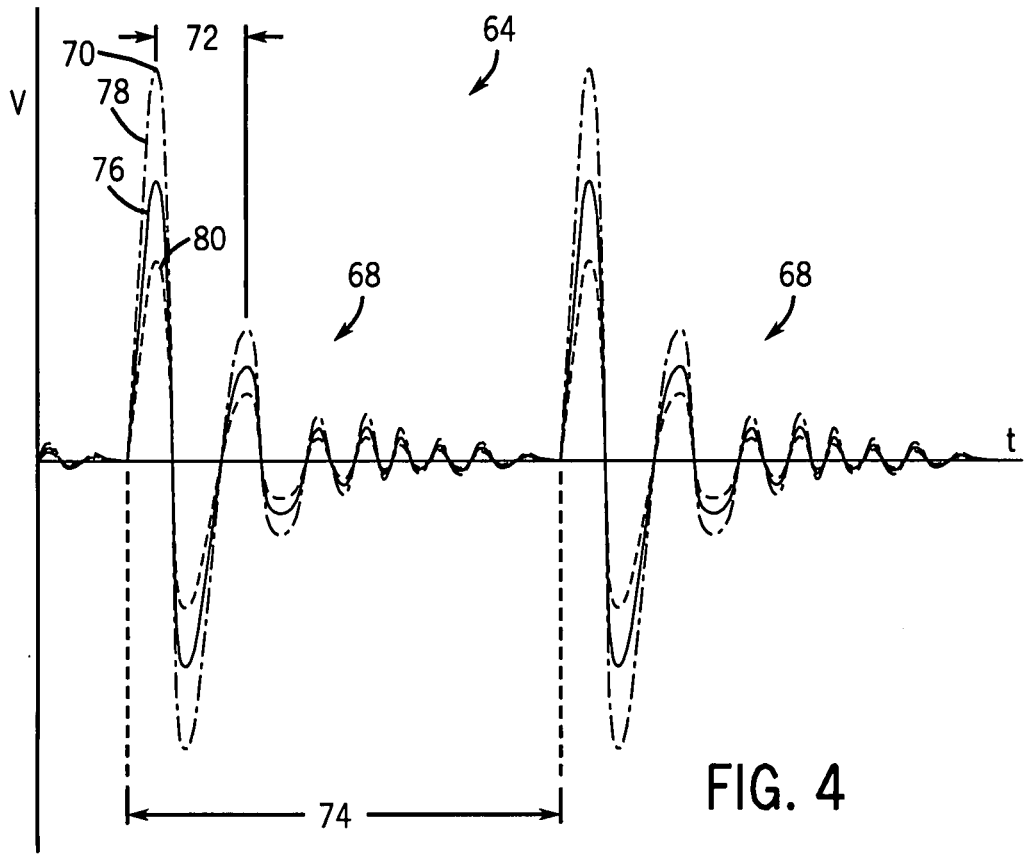
FIG. 4 is a more detailed view of a portion of the waveforms of FIG. 3 illustrating the effect of varying the high frequency output of the circuit of FIG. 2 on the welding power signal.

FIG. 4 illustrates several waveforms that may make up this portion of the complete waveform of FIG. 3. That is, FIG. 4 represents various waveforms that would be seen as a result of superimposing high frequency signals on the welding power signal applied to the workpiece. In reality, what would appear as a noisy portion 64 of the waveform 60 is composed of a series of resonant rings 68. Initially, the resonant rings would be represented by a nominal amplitude waveform 76. As the high frequency output is varied, the amplitude of the resonant rings varies accordingly. For example, when the high frequency output is decreased, the amplitude of the resulting resonant rings decreases, as depicted by the reduced amplitude waveform 80. Conversely, when the high frequency output is increased, the amplitude of the resulting resonant rings will increase, as denoted by the increased amplitude waveform 78.

Referring now to the increased amplitude waveform 78, each ring 68 reaches an initial peak 70, followed by a series of peaks, the magnitude of which decays exponentially over the period 74 between rings. The wavelength of period 72 of these rings is determined by the configuration (i.e. rating) of the capacitor 52 and the inductor 56 illustrated in FIG. 2, and particularly upon their relationship to one another, as will be readily appreciated by those skilled in the art. Each ring will typically have a frequency of 1-2 Mhz. The timing for each of the resonant rings 68 is regulated by opening and closing the switching device 34 illustrated in FIG. 2. Each time the switching device 34 is closed (turned on), the capacitor 52 discharges, and current flows to the inductor 56. The current will ring in devices 52, 34, and 56 until all the energy originally stored in device 52 as been dissipated by circuit parasitics or until switching device 34 is opened (turned off). While various frequencies may be used in practice, the period 74 illustrated in FIG. 4, that is, the spacing between the successive resonant rings, may be such as to provide a frequency on the order of 50 Hz (i.e., rings per second).

Figure 5:
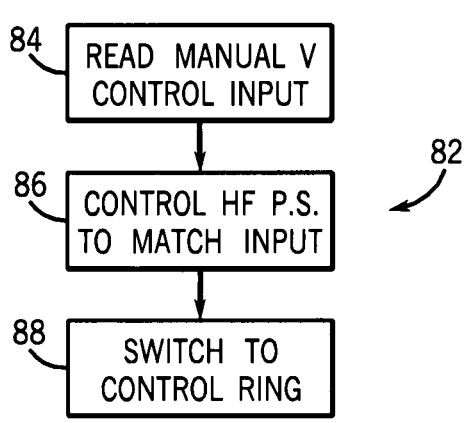
FIG. 5 is a flow chart illustrating an exemplary process for manually adjusting the high frequency voltage output of an exemplary welding system of the present invention.

FIG. 5 is a flow chart illustrating an exemplary process, designated by reference numeral 82, for manually adjusting the high frequency voltage output of the welding system. As illustrated at block 84, an operator selects the manual control input voltage to determine the current input voltage ($V_{in}$) setting for the high frequency power source 30. $V_{in}$ may be indicated visually by any means supported by welding system 12. The current input voltage setting is compared to the desired voltage setting necessary to produce an optimal output voltage ($V_{out}$), which may depend on the particular welding application. For example, when welding at low currents (i.e., below 10 amps), it is desirable to have less high frequency energy in the arc. As such, a lower voltage may be desired. Similarly, when welding at high currents, a higher voltage may be desired. The operator verifies that the current input voltage setting works with the selected process and, if the values do not match, the operator, through the operator interface 20, adjusts the input voltage setting to match the desired result, as designated in block 86. As discussed above, mechanisms for adjusting the input voltage may be provided by digital devices and analog circuits (i.e. dials associated with potentiometers), and so forth. Alternatively, where the operator interface 20 provides a software user interface, the input voltage may be adjusted by designating a set point through the software interface, wherein the set point corresponds to the desired input voltage level. As illustrated in block 88, once the new input voltage level is set, the high frequency controller 22 drives the switching device to control the resonant rings. Depending on the change in the input voltage level, the amplitude of the resonant ring waveforms (high frequency output) illustrated in FIG. 4 is adjusted accordingly.

Figure 6:
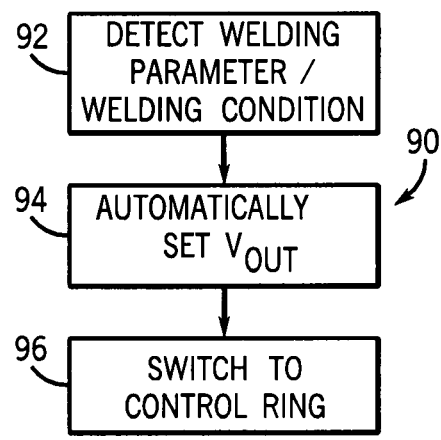
FIG. 6 is a flow chart illustrating an exemplary process for automatically adjusting the high frequency voltage output of an exemplary welding system of the present invention.

FIG. 6 is a flow chart illustrating an exemplary process, designated generally by reference numeral 90, for automatically adjusting the high frequency voltage output. As illustrated at block 92, the welding system 10 may detect various welding parameters and/or welding conditions. For example, the welding system may detect that a low current welding condition is present. Accordingly, the welding system controller 18 communicates the parameters and/or conditions to the high frequency controller 22. As discussed before, one or more sensors 36 may be provided for detecting welding parameters. The high frequency controller 22 adjusts $V_{out}$ to an optimal level based on the welding condition or welding parameters, as illustrated in block 94. When the optimal $V_{out}$ is reached, the high frequency controller 22 continues to drive the switching device to control the resonant rings (block 96). Depending on the change in the input voltage level, the amplitude of the resonant ring waveforms (high frequency output) illustrated in FIG. 4 is adjusted accordingly.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
a welding power source configured to apply electrical power to a welding torch for a welding operation;
a secondary power source configured to provide a variable voltage output;
a capacitive storage device charged by the secondary power source;
a transformer having a primary winding coupled to the output of the secondary power source for receiving power from the secondary power source and establishing a resonant frequency signal between the capacitive storage device and primary winding, and a secondary winding coupled to the welding power source; and
a switching device for regulating resonant rings between the capacitive storage device and the primary winding;
wherein the transformer superimposes the resonant frequency signals onto the welding power signal of the welding power source during periods of the resonant rings, and the energy of the superimposed signals being variable based upon the voltage of the secondary power source output.

2. The system of claim 1, comprising control circuitry for regulating the voltage of the secondary power source output.

3. The system of claim 1, wherein the secondary power source includes a regulated voltage converter.

4. The system of claim 1, wherein the switching device is controlled and allows for bi-directional current flow.

5. The system of claim 2, wherein the control circuitry includes an operator interface for manually setting the voltage of the secondary power source output.

6. The system of claim 2, wherein the control circuitry includes a controller for automatically varying the voltage of the secondary power source output based upon at least one welding parameter.

7. The system of claim 2, comprising a sensor configured to detect the voltage of the secondary power source output and to feed back a detected voltage signal to the control circuitry.

8. The system of claim 6, wherein the controller is configured to adjust the voltage of the secondary power source output as welding current from the welding power source is changed.

9. A welding system comprising:
a welding power source;
a high frequency power source including a DC power source coupled to a resonant network, the resonant network receiving power from the DC power source;
a switching device coupled to the resonant network and configured to cause resonant rings in the network; and
means for superimposing energy of the resonant rings on welding power signals from the welding power source;
wherein the energy of the resonant rings is varied by varying a voltage of DC power output by the DC power source.

10. The system of claim 9, wherein the resonant network includes at least one capacitor and one inductor.

11. The system of claim 9, wherein varying the voltage of DC power output is accomplished manually through an operator interface.

12. The system of claim 9, wherein varying the voltage of DC power output is accomplished automatically by control circuitry based upon at least one welding parameter.

13. The system of claim 10, wherein the means for superimposing energy includes a transformer having a primary winding formed by the inductor and a secondary winding coupled to the welding power source.

14. The system of claim 12, wherein automatically varying the DC power output includes communicating with one or more sensors configured to detect the voltage of the secondary power source output and to feed back a detected voltage signal to control circuitry.

15. A method for controlling a welding system comprising:
applying a voltage to a resonant network from a power source different from a welding power source;
operating a switch to cause resonant rings in the network;
superimposing the resonant rings on welding power from the welding power source applied to a welding torch; and
varying the voltage.

16. The method of claim 15, wherein a resonant network is used to superimpose the resonant rings.

17. The method of claim 15, wherein varying the voltage is accomplished manually through an operator interface.

18. The method of claim 15, wherein varying the voltage is accomplished automatically by control circuitry based upon at least one welding parameter.

19. The method of claim 16, wherein the resonant network includes at least one capacitor and one inductor.

20. The method of claim 18, wherein the at least one welding parameter is detected by one or more sensors.

* * * * *